United States Patent
Miyamoto et al.

(10) Patent No.: US 10,661,538 B2
(45) Date of Patent: May 26, 2020

(54) DECORATIVE SHEET

(71) Applicant: TOPPAN PRINTING CO., LTD., Taito-ku, Tokyo (JP)

(72) Inventors: Shinichi Miyamoto, Tokyo (JP); Masamitsu Nagahama, Chiba (JP); Akira Sato, Chiba (JP); Masatoshi Takahashi, Chiba (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 144 days.

(21) Appl. No.: 15/756,486

(22) PCT Filed: Sep. 2, 2016

(86) PCT No.: PCT/JP2016/075834
§ 371 (c)(1),
(2) Date: Feb. 28, 2018

(87) PCT Pub. No.: WO2017/038980
PCT Pub. Date: Mar. 9, 2017

(65) Prior Publication Data
US 2018/0244022 A1    Aug. 30, 2018

(30) Foreign Application Priority Data
Sep. 4, 2015   (JP) ................. 2015-174472

(51) Int. Cl.
| | |
|---|---|
| B32B 27/08 | (2006.01) |
| B32B 27/20 | (2006.01) |
| B32B 27/32 | (2006.01) |
| B32B 7/12 | (2006.01) |
| B32B 27/18 | (2006.01) |
| B44C 5/04 | (2006.01) |

(52) U.S. Cl.
CPC ........... *B32B 27/08* (2013.01); *B32B 7/12* (2013.01); *B32B 27/18* (2013.01); *B32B 27/20* (2013.01); *B32B 27/32* (2013.01); *B32B 2307/3065* (2013.01); *B32B 2307/516* (2013.01); *B32B 2307/518* (2013.01); *B32B 2323/04* (2013.01); *B32B 2405/00* (2013.01); *B32B 2451/00* (2013.01)

(58) Field of Classification Search
None
See application file for complete search history.

(56) References Cited

U.S. PATENT DOCUMENTS

2003/0054165 A1*  3/2003  Yamanaka ............ B29C 55/005
                                                                        428/343
2013/0287986 A1   10/2013  Yamamuro et al.

FOREIGN PATENT DOCUMENTS

| JP | 2000-185386 A | 7/2000 |
|---|---|---|
| JP | 2001-214013 A | 8/2001 |
| JP | 2003-311901 A | 11/2003 |
| JP | 2004-149664 A | 5/2004 |
| JP | 2004-160818 A | 6/2004 |
| JP | 2007-100045 A | 4/2007 |
| JP | 2007-100046 A | 4/2007 |
| JP | 2007-100047 A | 4/2007 |
| JP | 2007-204666 A | 8/2007 |
| JP | 2016-155233 A | 9/2016 |
| WO | WO 2012/090498 A1 | 7/2012 |

OTHER PUBLICATIONS

Extended European Search Report dated Jan. 3, 2019, in European Patent Application No. 16842009.9, 6 pages.

* cited by examiner

*Primary Examiner* — Sheeba Ahmed
(74) *Attorney, Agent, or Firm* — Squire Patton Boggs (US) LLP

(57) ABSTRACT

An object of the present invention is to provide a decorative sheet excellent in post-processability and usable for flame-retardant application. A decorative sheet (1) according to one aspect of the present invention includes a plurality of resin layers. At least one layer of the resin layers is formed of a uniaxially stretched resin sheet (3) or a biaxially stretched resin sheet (3) constituted of a thermoplastic resin composition. The thermoplastic resin composition is produced by adding an inorganic pigment vesicle to a polyolefin-based resin. The inorganic pigment vesicle is produced by including an inorganic pigment in a vesicle having a monolayer outer membrane. The uniaxially stretched resin sheet (3) and the biaxially stretched resin sheet (3) have a value of a dichroic ratio R of R≥0.3. The value is calculated from absorbance peak values at a wave number of 997(±5) cm$^{-1}$ of an infrared absorption spectrum in a direction parallel to an extrusion direction during film manufacturing and an infrared absorption spectrum in a direction perpendicular to the extrusion direction during the film manufacturing obtained by a polarized Fourier type infrared spectroscopy measurement using the following Formula (1).

[Formula 1]

Dichroic ratio $R$=(Absorbance peak value in parallel direction−Absorbance peak value in perpendicular direction)/(Absorbance peak value in parallel direction+Absorbance peak value in perpendicular direction)   (1)

2 Claims, 1 Drawing Sheet

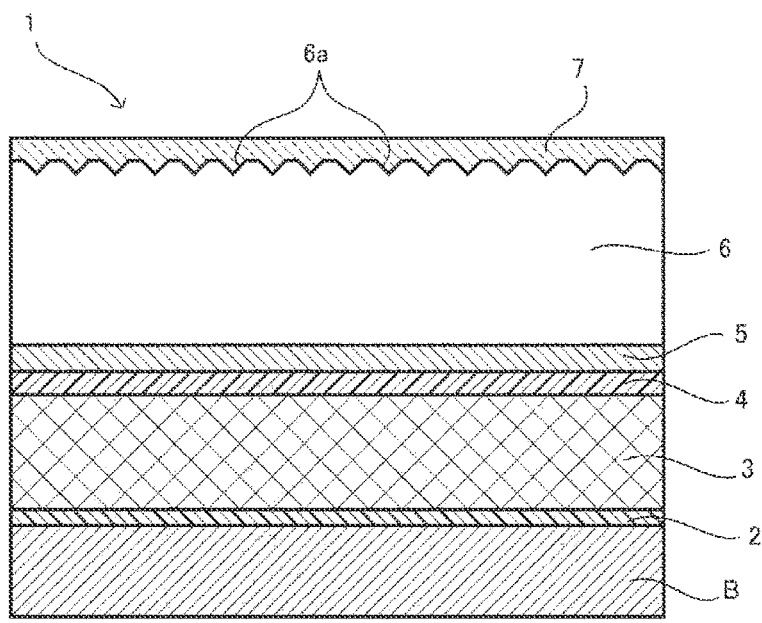

DECORATIVE SHEET

TECHNICAL FIELD

The present invention relates to a decorative sheet.

BACKGROUND ART

For example, PTL 1 to PTL 3 describe technologies related to a decorative sheet using a polyolefin-based resin.

CITATION LIST

Patent Literature

PTL 1: JP 2003-311901 A
PTL 2: JP 2004-149664 A
PTL 3: JP 2004-160818 A

SUMMARY OF INVENTION

Technical Problem

The above-described decorative sheet using the polyolefin-based resin has a problem that there are not so many decorative sheets excellent in post-processability and usable for flame-retardant application.

The present invention has focused on the above-described points, and the object is to provide a decorative sheet excellent in post-processability and usable for flame-retardant application.

Solution to Problem

To achieve the above-described object, a decorative sheet according to one aspect of the present invention includes a plurality of resin layers. At least one layer of the resin layers is formed of a uniaxially stretched resin sheet or a biaxially stretched resin sheet constituted of a thermoplastic resin composition. The thermoplastic resin composition includes a polyolefin-based resin to which an inorganic pigment vesicle is added. The inorganic pigment vesicle contains an inorganic pigment in a vesicle having a monolayer outer membrane. The uniaxially stretched resin sheet and the biaxially stretched resin sheet have a value of a dichroic ratio R of R≥0.3. The value is calculated from absorbance peak values at a wave number of 997 (±5) cm$^{-1}$ of an infrared absorption spectrum in a direction parallel to an extrusion direction during film manufacturing and an infrared absorption spectrum in a direction perpendicular to the extrusion direction during the film manufacturing obtained by a polarized Fourier type infrared spectroscopy measurement using the following Formula (1). The value of the dichroic ratio R is a ratio of a degree of orientation between the value in a direction parallel to the extrusion direction and the value in a direction perpendicular to the extrusion direction of the uniaxially stretched resin sheet and the biaxially stretched resin sheet.

[Formula 1]

Dichroic ratio $R$=(Absorbance peak value in parallel direction−Absorbance peak value in perpendicular direction)/(Absorbance peak value in parallel direction+Absorbance peak value in perpendicular direction) (1)

Advantageous Effects of Invention

With a decorative sheet according to one aspect of the present invention, a decorative sheet excellent in post-processability and usable for flame-retardant application can be provided.

BRIEF DESCRIPTION OF DRAWINGS

FIG. 1 is a cross-sectional view illustrating a configuration of a decorative sheet according to an embodiment of the present invention.

DESCRIPTION OF EMBODIMENTS

A decorative sheet of this embodiment is a decorative sheet that includes a plurality of resin layers. At least one layer of the resin layers is formed of a uniaxially stretched resin sheet or a biaxially stretched resin sheet constituted of a thermoplastic resin composition. The thermoplastic resin composition includes a polyolefin-based resin to which an inorganic pigment vesicle is added. The inorganic pigment vesicle contains an inorganic pigment in a vesicle having a monolayer outer membrane. Here, the uniaxially stretched resin sheet means a resin sheet formed by performing a stretching process in a direction parallel to an extrusion direction when the resin sheet is extruded to manufacture a film. Additionally, the biaxially stretched resin sheet means a resin sheet formed by performing the stretching process in two directions, the direction parallel to the extrusion direction when the resin sheet is extruded to manufacture a film and a direction perpendicular to the extrusion direction on the resin sheet surface. The uniaxially stretching process or the biaxially stretching process can be appropriately selected from the known methods for execution. The following is important. The uniaxially stretched resin sheet and the biaxially stretched resin sheet have a value of a dichroic ratio R of R≥0.3. The value is calculated from absorbance peak values at a wave number of 997(±5) cm$^{-1}$ of the infrared absorption spectrum in the parallel and the infrared absorption spectrum in the perpendicular direction obtained by the polarized Fourier type infrared spectroscopy measurement using the following formula (2). The value of dichroic ratio R is especially preferable to be 0.5≤R≤0.9.

[Formula 2]

Dichroic ratio $R$=(Absorbance peak value in parallel direction−Absorbance peak value in perpendicular direction)/(Absorbance peak value in parallel direction+Absorbance peak value in perpendicular direction) (2)

A thermoplastic resin composition of the decorative sheet of this embodiment is a polyolefin-based resin to which inorganic pigment vesicle is added. This polyolefin-based resin includes, for example, one produced by homopolymerizing or copolymerizing two kinds or more of, in addition to polypropylene, polyethylene, polybutene, and the like, a olefin (for example, propylene, 1-butene, 1-pentene, 1-hexene, 1-heptene, 1-octene, 1-nonene, 1-decene, 1-undecene, 1-dodecene, tridecene, 1-tetradecene, 1-pentadecene, 1-hexadecene, 1-heptadecene, 1-octadecene, 1-nonadecen, 1-eicosene, 3-methyl-1-butene, 3-methyl-1-pentene, 3-ethyl-1-pentene, 4-methyl-1-pentene, 4-methyl-1-hexene, 4,4-dimethyl-1-pentene, 4-ethyl-1-hexene, 3-ethyl-1-hexene, 9-methyl-1-decene, 11-methyl-1-dodecene, and 12-ethyl-1-tetradecene). Additionally, the polyolefin-based resin includes the one produced by copolymerizing ethylene or a olefin and a monomer other than that, such as an ethylene/vinyl acetate copolymer, an ethylene/vinyl alcohol copolymer, an ethylene/methyl methacrylate copolymer, an ethylene/ethyl methacrylate copolymer, an ethylene/butyl methacrylate copolymer, an ethylene/methyl acrylate copolymer, an ethylene/ethyl acrylate copolymer, and an ethylene/butyl acrylate copolymer.

The inorganic pigment vesicle can be prepared by a method referred to as a supercritical reverse phase evaporation method. The supercritical reverse phase evaporation method can be performed using the supercritical reverse phase evaporation methods and devices disclosed in WO 02/032564, JP 2003-119120 A, JP 2005-298407 A, and JP 2008-063274 A proposed by the inventors of the present invention.

The following describes the supercritical reverse phase evaporation method in more detail. The supercritical reverse phase evaporation method is a method that adds a water phase containing inorganic pigment as an encapsulated substance in a mixture into which phospholipid that forms a membrane of the vesicle in carbon dioxide in a supercritical state or under a temperature condition or under a pressure condition equal to or more than a critical point is uniformly dissolved to produce the capsule-like vesicle having a monolayer membrane that includes the encapsulated substance. The carbon dioxide in the supercritical state means the carbon dioxide in the supercritical state equal to or more than a critical temperature (30.98° C.) and a critical pressure (7.3773±0.0030 MPa). Additionally, the carbon dioxide under a temperature condition or under a pressure condition equal to or more than a critical point means the carbon dioxide under a condition where only the critical temperature or only the critical pressure exceeds the critical condition. This method allows obtaining unilamellar vesicle 50 to 800 nm in diameter.

It is only necessary that the above-described inorganic pigment is the flame-retardant pigment and is roughly classified into natural inorganic pigment and synthetic inorganic pigment. The natural inorganic pigment includes, for example, earth pigment, calcined clay pigment, and mineral pigment. The synthetic inorganic pigment includes, for example, oxide pigment, hydroxide pigment, sulfide pigment, silicate pigment, phosphate pigment, carbonate pigment, metallic powder pigment, and carbon pigment. This embodiment can use one kind or two kinds or more of these natural inorganic pigments and synthetic inorganic pigments in combination. Since the flame retardancy is lost, organic pigment is not preferable.

The phospholipid, which forms the outer membrane of the vesicle, includes, for example, glycerophospholipid such as phosphatidylcholine, phosphatidylethanolamine, phosphatidylserine, phosphatidic acid, phosphatidylglycerol, phosphatidylinositol, cardiolipin, egg yolk lecithin, hydrogenated egg yolk lecithin, soybean lecithin, and hydrogenated soybean lecithin, and sphingophospholipid such as sphingomyelin, ceramide phosphoryl ethanolamine, and ceramide phosphoryl glycerol.

It is only necessary that the outer membrane of the vesicle at least contains biological lipid such as the phospholipid, the outer membrane may be formed from a mixture of the biological lipid and other substances as described below.

As the other substances forming the membrane of the vesicle, for example, a nonionic surfactant or a mixture of this and cholesterols or triacylglycerol is preferably used. Among these substances, as the nonionic surfactant, for example, one kind or two kinds or more of polyglycerol ether, dialkyl glycerin, polyoxyethylene hardened castor oil, polyoxyethylene alkyl ether, polyoxyethylene sorbitan fatty acid ester, sorbitan fatty acid ester, polyoxyethylene polyoxypropylene copolymer, polybutadiene-polyoxyethylene copolymer, poly butadiene-poly 2-vinyl pyridine, polystyrene-polyacrylic acid copolymer, polyethylene oxide-poly ethyl ethylene copolymer, and polyoxyethylene-polycaprolactam copolymer can be used. The cholesterols can include, for example, cholesterol, α-cholestanol, β-cholestanol, cholestane, desmosterol (5,24-cholestadiene-3β-ol), sodium cholate, or cholecalciferol. For example, by forming an inclusion not a water-soluble inclusion as the vesicle wrapped by a water-soluble dispersing agent, the inclusion not the water-soluble inclusion can be uniformly dispersed into, for example, water-soluble solvent.

Additive amount of such the inorganic pigment vesicle is preferably 50 pts.wt. to 70 pts.wt. with respect to 100 pts.wt. of the polypropylene resin and the addition by 70 pts.wt. is especially preferable.

It is important for the decorative sheet of this embodiment that a uniaxially stretched resin sheet and a biaxially stretched resin sheet, which are obtained by extruding the above-described thermoplastic resin composition to manufacture the film and performing a uniaxially stretching process or a biaxially stretching process, have a thickness of 20 μm to 150 μm.

By performing the uniaxially stretching process or the biaxially stretching process on these uniaxially stretched resin sheet and biaxially stretched resin sheet, a long chain of molecules in the resin is orientated in at least one of a parallel direction, which is parallel to an extrusion direction during the film manufacturing, and a perpendicular direction, which is perpendicular to the extrusion direction during the film manufacturing on this seat surface. This occurs by the long chain of the molecules formed of a C—C backbone in the resin to which the inorganic pigment vesicle is added being pulled and lined in the stretching direction by performing the stretching process on the resin sheet. When the long chain of the molecules in the resin is oriented in the predetermined direction by performing the stretching process, since mechanical strength in this stretching direction is improved, the uniaxially stretched resin sheet and the biaxially stretched resin sheet having the flame retardancy excellent in post-processability can be obtained. Furthermore, with the uniaxially stretched resin sheet and the biaxially stretched resin sheet, since the stretching process solves unevenness on the surface caused by this inorganic pigment vesicle, which possibly occurs when the inorganic pigment vesicle is highly filled, the resin sheet excellent in smoothness can be obtained. This ensures configuring the uniaxially stretched resin sheet and the biaxially stretched resin sheet excellent in printability.

The following describes a polarized Fourier type infrared spectroscopy measurement and the dichroic ratio R. First, the infrared spectroscopy measurement is one of a spectrometry measurement method that obtains information on a chemical structure and a state of a substance using a principle that an amount of infrared light as light of a wavelength at 0.7 μm to 1000 μm absorbed into this substance is changed based on vibration or rotational mode of the molecules of the substance. Especially, the wavelength range referred to as mid-infrared with the wavelength of 2.5 μm to 4 μm in which a spectrum unique to the substance appears is mainly used.

The Fourier type is a method described in the following. That is, light (infrared light) emitted from a light source is caused to obliquely enter an interferometer via a beam splitter and is divided into transmitted light and reflected light. The transmitted light and the reflected light are reflected by a fixed mirror and a moving mirror, respectively, and return to the beam splitter, thus synthesized and becoming an interference wave. An optical path difference between the transmitted light and the reflected light differ depending on a position that the moving mirror is moved. Therefore, a different interference wave is obtained depending on the position of the moving mirror. A sample is irradiated with this interference wave to measure a signal of the transmitted light or the reflected light of the sample. The Fourier type means a method that transforms the obtained signal using a Fourier transformation method to obtain an infrared spectrum of each wavenumber component.

The polarized Fourier type infrared spectroscopy measurement is a method that, when the infrared light absorbed into the sample is measured, transforms this infrared light into light referred to as linear polarization in which an electric field of the light vibrates only in a constant direction using a polarizer to measure a degree of the long chain of the molecules oriented in the stretching direction of the stretched resin.

Next, when the polarized Fourier type infrared spectroscopy measurement measures the sheet-shaped resin, first, the polarizer is installed at an installation angle of 0° (the direction of the electric field is the direction perpendicular to a sample installation surface). After that, the infrared spectroscopy measurement is performed adjusting the sheet-shaped resin such that the stretching direction becomes parallel to the direction of the electric field. Next, the angle of the sheet-shaped resin is rotated by 90° and the infrared spectroscopy measurement is performed adjusting the sheet-shaped resin such that the stretching direction of the sheet-shaped resin becomes perpendicular to the direction of the electric field. The dichroic ratio R means a value calculated from the absorbance peaks near wave number 997 cm$^{-1}$ of the obtained two infrared absorption spectra using the above-described Formula (1). The dichroic ratio R represents a ratio between a degree of orientation of the long chain of the molecules in the resin in the direction parallel to the stretching direction of the sheet-shaped resin and that in the direction perpendicular to the stretching direction. At the absorbance peak of the polyolefin-based resin, a wave-number range corresponding to lateral shake and vibration of $CH_3$ is present near 997 cm$^{-1}$. In view of this, when the C—C backbone (the long chain of the molecules) in the resin is aligned in the stretching direction through the stretching process, the lateral shake and vibration of $CH_3$ are also aligned in one direction in association with this, thereby increasing and decreasing a dipole moment of $CH_3$. It is known that when the electric field of the infrared light is in the direction identical to the increasing and decreasing direction of the dipole moment of $CH_3$, absorption intensity of the infrared becomes the maximum; therefore, the difference in the degree of orientation significantly affects the value of the peak appearing near the wave number 997 cm$^{-1}$ and more specifically, at the wave number 997 (±5) cm$^{-1}$. That is, the ratio of the degree of orientation of the C—C backbone (the long chain of the molecules) in both directions of the uniaxially stretched resin sheet and the biaxially stretched resin sheet can be calculated from the values of the peaks appearing at the wave number 997(±5) cm$^{-1}$ of the infrared absorption spectrum in the parallel direction and the infrared absorption spectrum in the perpendicular direction. Generally, as the draw ratios differ between the parallel direction and the perpendicular direction (as the value of the dichroic ratio R increases), hardness of the resin becomes high, and as the draw ratio of the parallel direction is close to the draw ratio of the perpendicular direction (as the value of the dichroic ratio R decreases), the mechanical strength becomes close to the mechanical strength that the resin originally has. Some of examples described later perform the biaxially stretching process; therefore, the infrared spectroscopy measurement was performed placing the sheet-shaped resin such that the extrusion direction during the film manufacturing became parallel to or perpendicular to the direction of the electric field.

With the uniaxially stretched resin sheet and the biaxially stretched resin sheet as described above, first, the inorganic pigment is added as the inorganic pigment vesicle to produce the resin sheet. Accordingly, the inorganic pigment is not secondarily aggregated in the polyolefin-based resin and can be uniformly dispersed. In view of this, even when the large amount of inorganic pigment is added, the uniaxially stretched resin sheet and the biaxially stretched resin sheet excellent in flame retardancy can be manufactured without deteriorating the mechanical strength.

Secondly, the use of the resin sheet in which the degree of orientation of the uniaxially stretched resin sheet and the biaxially stretched resin sheet to which the inorganic pigment vesicle is added is R≥0.3 by the value of the dichroic ratio R ensures obtaining the flame-retardant uniaxially stretched resin sheet and biaxially stretched resin sheet excellent in post-processability. Especially, this property is significantly recognized in the uniaxially stretched resin sheet and the biaxially stretched resin sheet with the value of dichroic ratio R of 0.5≤R≤0.9.

(Overall Configuration)

The following describes a concrete example of the configuration of the decorative sheet of this embodiment with reference to FIG. 1.

Here, the drawings are illustrated schematically; therefore, a relationship between a thickness and a planar dimension, a ratio of a thickness of each layer, and a similar specification are different from actual ones. Besides, known structures are illustrated by rough sketch to simplify the drawings. Further, the embodiments described later are exemplary configurations that embody the technical idea of the present invention, and do not specify the technical idea of the present invention to the materials, shapes, configurations, and a similar matter of components described later. Various modifications can be added to the technical idea of the present invention within the technical scope specified by claims described in CLAIMS.

As illustrated in FIG. 1, the decorative sheet of this embodiment is a decorative sheet 1 including a plurality of resin layers. The following describes an aspect in which the above-described uniaxially stretched resin sheet and biaxially stretched resin sheet are a primary film layer 3. The decorative sheet 1 has a configuration of laminating a primer layer 2, the primary film layer 3, a pattern printed layer 4, an adhesive layer 5, a transparent resin layer 6, and a top coat layer 7 from a side facing to a substrate B to which the decorative sheet 1 stuck. The substrate B includes, for example, engineered woods, inorganic boards, or metal plates. The decorative panel of this embodiment has a configuration of sticking the decorative sheet 1 to the substrate B.

[Primer Layer 2]

The primer layer 2 can be appropriately selected for use among nitrocellulose, cellulose, a vinyl chloride-vinyl acetate copolymer, polyvinyl butyral, polyurethane, acrylic, and a polyester-based material, and the like alone or modified products thereof. These may be any of aqueous, solvent, and emulsion type. The curing method is also appropriately selectable for use from a one-part type that performs curing alone, a two-part type that uses a curing agent together with the main agent, a type that performs curing by irradiation of, for example, ultraviolet rays and an electron beam, and a similar type. The general curing method uses the two-part type that performs curing by mixing an isocyanate-based curing agent with the urethane-based main agent. This method is preferable from aspects such as workability, a cost, and a cohesive force of the resin itself. Except for the above-described binders, for example, a coloring agent such as pigment and dye, extender pigment, solvent, and various additives, is added. Especially, the primer layer 2 is positioned on the backmost surface of the decorative sheet 1. Accordingly, considering rolling up the decorative sheet 1 as a continuous plastic film (web shape), it is necessary to avoid a blocking such as the films being in close contact with one another and being less likely to slide or being less likely to be peeled off and to enhance adhesiveness with the adhesive. To do so, inorganic filler such as silica, alumina, magnesia, titanium oxide, and barium sulfate may be added to the primer layer 2. In order to secure the adhesiveness with the substrate B, the layer thickness is preferably in the range of 0.1 μm to 3 μm.

[Primary Film Whole Cloth Layer 3]

The primary film layer 3 includes the above-described uniaxially stretched resin sheet 3 and biaxially stretched resin sheet 3 made of the thermoplastic resin composition produced by adding the inorganic pigment vesicle in which the inorganic pigment is encapsulated in the vesicle having a monolayer outer membrane to the polyolefin-based resin. It is important for the uniaxially stretched resin sheet 3 and the biaxially stretched resin sheet 3 to have the value of dichroic ratio R of R≥0.3, which is calculated from the absorbance peak values at the wave number of 997 (±5) $cm^{-1}$ of the infrared absorption spectrum in the direction parallel to the extrusion direction and the infrared absorption spectrum in the direction perpendicular to the extrusion direction obtained by the polarized Fourier type infrared spectroscopy measurement using the above-described Formula (1). The value of dichroic ratio R of 0.5≤R≤0.9 is especially preferable. Thus, by performing the uniaxially stretching process or the biaxially stretching process in at least one of the direction parallel to the extrusion direction during the film manufacturing and the direction perpendicular to this extrusion direction on the uniaxially stretched resin sheet 3 and the biaxially stretched resin sheet 3 to have the above-described value of dichroic ratio R.

[Pattern Printed Layer 4]

As the pattern printed layer 4, the material similar to the primer layer 2 is applicable. The pigment of high versatility includes, for example, condensed azo, insoluble azo, quinacridone, isoindoline, anthraquinone, imidazolone, cobalt, phthalocyanine, carbon, titanium oxide, iron oxide, and pearl pigment such as mica. Using the above-described materials, for example, gravure printing, offset printing, screen-printing, flexography, electrostatic printing, or ink jet printing is performed on the primary film layer 3, thus ensuring forming the pattern printed layer 4. Different from a method that forms the pattern printed layer 4 through an application of ink made of a mixture of the above-described binder and pigment, a pattern can be formed by deposition or sputtering of various metals.

[Adhesive Layer 5]

The adhesive layer 5 is selectable from, for example, acrylic-based, polyester-based, and polyurethane-based materials for use. Generally, in terms of workability, a cost and a high cohesive force, the two-part type material that uses urethane-based polyol as the main agent and isocyanate as the curing agent is used.

[Transparent Resin Layer 6]

As the transparent resin layer 6, the transparent resin sheet 6 produced by adding various additives such as an existing heat stabilizer, flame-retardant agent, UV absorber, light stabilizer, anti-blocking agent, catalyst scavenger, coloring agent, light scattering agent, and gloss adjuster to the polypropylene resin as necessary is applicable. To improve the surface strength, high crystallinity polypropylene resin is preferably used. As the heat stabilizer, for example, a phenol-based, a sulfur-based, a phosphorus-based, and a hydrazine-based substances are applicable. As the flame-retardant agent, for example, aluminum hydroxide and magnesium hydroxide are applicable. As the UV absorber, for example, benzotriazole-based, benzoate-based, benzophenone-based, and triazine-based substances are applicable. As the light stabilizer, for example, a hindered amine-based substance is applicable. As necessary, an emboss pattern 6a with a predetermined unevenness pattern may be formed on the surface of the transparent resin layer 6 as illustrated in FIG. 1.

[Film Manufacturing Method of Transparent Resin Sheet 6]

The following describes a detailed film manufacturing flow of the transparent resin sheet 6 with an example of crystalline polypropylene resin. First, a resin composition pellet produced by adding the above-described existing various additives to the crystalline polypropylene resin as the main component is put into a melt extruder. Afterwards, this pellet is melted into liquid through kneading and heating and the liquid resin composition is extruded from a T-Die disposed at an extrusion port to a cooling roll disposed at the downstream side at a predetermined width. At this time, the liquid resin composition extruded from the T-Die is brought into contact with this cooling roll to be quenched to a cooling temperature and then crystallization progresses during conveyance at a temperature near the cooling temperature. This cooling roll rotates around a center axis of the roll at a predetermined rotation speed. The resin composition brought into contact with the cooling roll becomes the sheet-shaped transparent resin sheet 6. The transparent resin sheet 6 is conveyed to the downstream side at a predetermined conveyance velocity and is finally rolled up by a winding roll.

[Top Coat Layer 7]

The top coat layer 7 can be appropriately selected from, for example, a polyurethane-based, an acrylic-based, an acrylic silicon-based, a fluorine-based, an epoxy-based, a vinyl-based, a polyester-based, a melamine-based, an amino alkyd-based, and an urea-based substances for use. The form of the material is also not especially limited to the aqueous, the emulsion, the solvent type, or a similar type. The curing method is also appropriately selectable for use from the one-part type that performs curing alone, the two-part type that uses the curing agent together with the main agent, the type that performs curing by irradiation of, for example, ultraviolet rays and an electron beam, and a similar type. Especially, the method that performs curing by mixing an isocyanate-based curing agent with the urethane-based main agent is preferable from aspects such as workability, the cost, and the cohesive force of the resin itself.

[Manufacturing Method of Decorative Sheet 1]

With the decorative sheet 1 of this embodiment, first, a corona treatment is performed on both surfaces of the uniaxially stretched resin sheet 3 or the biaxially stretched resin sheet 3 as the primary film layer 3. Then, the pattern printed layer 4 is laminated over one surface of the uniaxially stretched resin sheet 3 or the biaxially stretched resin sheet 3 and the primer layer 2 is laminated on the other surface. The transparent resin sheet 6 as the transparent resin layer 6 formed by the film manufacturing flow is bonded and laminated on the surface of the uniaxially stretched resin sheet 3 or the biaxially stretched resin sheet 3 on the pattern printed layer 4 side via the adhesive layer 5, for example, by using a method such as a lamination method by heating and pressurizing, an extrusion lamination method, or a dry lamination method to form the laminated film. At this time, when the emboss pattern 6a is disposed on the surface of the transparent resin layer 6, the emboss pattern 6a is formed on this laminated film by the method by heating and pressurizing or a method that forms the emboss pattern 6a simultaneously with the extrusion lamination using the cooling roll on which unevenness is formed. Finally, the top coat layer 7 is laminated on the surface of the transparent resin layer 6 of this laminated film to obtain the decorative sheet 1.

This embodiment describes the decorative sheet 1 including the transparent resin layer 6. To configure a decorative sheet with higher flame retardancy, the configuration from which the transparent resin layer 6 is removed may be used. In the case where sufficient adhesiveness is obtained between the substrate B and the primary film layer 3, the primer layer 2 can be omitted.

With such the decorative sheet 1, it is preferable that the primer layer 2 is 0.1 μm to 20 μm, the uniaxially stretched resin sheet 3 and the biaxially stretched resin sheet 3 as the primary film layer 3 are 30 μm to 250 μm, the pattern printed layer 4 is 3 μm to 20 μm, the adhesive layer 5 is 1 μm to 20 μm, the transparent resin layer 6 is 20 μm to 200 μm, and the top coat layer 7 is 3 μm to 20 μm. The total thickness of the decorative sheet 1 is preferably in the range of 57 μm to 530 μm.

Effects of Embodiment (1) The decorative sheet 1 according to one aspect of the present invention includes the plurality of resin layers. At least one layer of the resin layers is formed of the uniaxially stretched resin sheet 3 or the biaxially stretched resin sheet 3 constituted of the thermoplastic resin composition. The thermoplastic resin composition includes the polyolefin-based resin to which the inorganic pigment vesicle is added. The inorganic pigment vesicle contains the inorganic pigment in the vesicle having a monolayer outer membrane. The uniaxially stretched resin sheet 3 and the biaxially stretched resin sheet 3 have the value of the dichroic ratio R of R≥0.3. The value is calculated from the absorbance peak values at the wave number of 997 (±5) $cm^{-1}$ of the infrared absorption spectrum in the direction parallel to the extrusion direction during film manufacturing and the infrared absorption spectrum in the direction perpendicular to the extrusion direction during the film manufacturing obtained by the polarized Fourier type infrared spectroscopy measurement using the following Formula (3). The value of the dichroic ratio R is the ratio of the degree of orientation between the value in a direction parallel to the extrusion direction and the value in a direction perpendicular to the extrusion direction of the uniaxially stretched resin sheet 3 and the biaxially stretched resin sheet 3.

[Formula 3]

Dichroic ratio R=(Absorbance peak value in parallel direction−Absorbance peak value in perpendicular direction)/(Absorbance peak value in parallel direction+Absorbance peak value in perpendicular direction) (3)

With this configuration, the inorganic pigment vesicle is added and the dichroic ratio R is R≥0.3; therefore, the decorative sheet usable for flame-retardant application excellent in post-processability can be provided.

(2) With the decorative sheet 1 according to one aspect of the present invention, the value of dichroic ratio R of the uniaxially stretched resin sheet 3 and the biaxially stretched resin sheet 3 may be 0.5≤R≤0.9.

This configuration allows providing the decorative sheet more excellent in post-processability.

EXAMPLES

The following describes specific examples of the decorative sheet 1 of this embodiment.

<Preparation Method of Inorganic Pigment Vesicle>

First, the inorganic pigment vesicle used in this example was prepared by the following method. Methanol of 100 pts.wt., calcium carbonate (SOFTEN 2000 manufactured by SHIRAISHI CALCIUM KAISHA, LTD.) as the inorganic pigment of 70 pts.wt., and phosphatidylcholine as the phospholipid forming the outer membrane of the vesicle of 5 pts.wt. were put in a high pressure stainless steel container held at 60° C. and sealed. Carbon dioxide was injected such that the pressure became 20 MPa to produce the supercritical state. After that, ion exchanged water was injected by 100 pts.wt. while heavily stirred and mixed. After the stirring for 15 minutes with the temperature and the pressure inside the container were held, the carbon dioxide was discharged to return the inside to atmospheric pressure. Thus, calcium carbonate vesicle that includes the calcium carbonate as the inorganic pigment in the vesicle having a monolayer outer membrane made of the phospholipid was obtained.

<When Uniaxially Stretching Process is Performed> Examples 1 to 9 and Comparative Examples 1 to 4

With Examples 1 to 9 and Comparative Examples 1 to 4, the resin sheet made of the thermoplastic resin composition as the primary film layer 3 was formed of the uniaxially stretched resin sheet 3 produced by adding the calcium carbonate vesicle by 50, 70, or 80 pts.wt. with respect to high-density polyethylene and performing the uniaxially stretching process.

Specifically, resin produced by adding hindered phenol-based antioxidant (Irganox 1010 manufactured by BASF) by 500 PPM, benzotriazole-based UV absorber (Tinuvin 328 manufactured by BASF) by 2000 PPM, and hindered amine-based light stabilizer (Chimassorb 944 manufactured by BASF) by 2000 PPM to highly crystalline homopolypropylene resin with a pentad fraction of 97.8%, a melt flow rate (MFR) of 15 g/10 min (230° C.), and a molecular weight distribution MWD (Mw/Mn) of 2.3 was extruded with a melt extruder. Thus, the transparent resin sheet 6 with the thickness of 80 μm as the transparent resin layer 6 was manufactured as the film. Next, to 100 pts.wt. of the high-density polyethylene (HI-ZEX 5305E, MFR=0.8 g/10 min (190° C.) manufactured by Prime Polymer Co., Ltd.), the above-described calcium carbonate vesicle was added by 50, 70 or 80 pts.wt. After melting and kneading the substance with a meshing-type twin-screw extruder, the substance was pelletized by a strand cut method to obtain a thermoplastic resin composition pellet. The above-described calcium carbonate vesicle was added by 50 pts.wt. in Examples 1 to 3, by 70 pts.wt. in Examples 4 to 9 and Comparative Examples 1 and 2, and by 80 pts.wt. in Comparative Examples 3 and 4. The extrusion molding method using thermoplastic resin composition pellet thus obtained manufactured the film of the resin sheet at the film thickness of 120 μm. The obtained resin sheet was cut by 30 cm square and the uniaxially stretching process was performed in the direction parallel to the extrusion direction using a stretching device. The uniaxially stretched resin sheet 3 with the thickness of 30 μm with the draw ratio of four times was manufactured. The pattern printing was performed on one surface of the uniaxially stretched resin sheet 3 on which the stretching process was performed using two-part curing type urethane ink (V180 manufactured by TOYO INK CO., LTD.) to form the pattern printed layer 4, and the primer layer 2 was applied on the other surface of the uniaxially stretched resin sheet 3. On the surface side where the pattern printed layer 4 of the uniaxially stretched resin sheet 3 was formed, the transparent resin sheet 6 was bonded by a dry lamination method via the adhesive layer 5 made of a dry lamination adhesive (TAKELAC A540 manufactured by Mitsui Chemicals, Inc., application amount of 2 g/m²). Finally, the emboss pattern 6a was formed on the surface of the transparent resin layer 6 using a mold roll for embossing. After that, the two-part curing type urethane top coat (W184 manufactured by DIC CORPORATION) was applied with the application amount of 3 g/m² so as to cover the emboss pattern 6a. Thus, the top coat layer 7 was formed and the decorative sheet 1 with the total thickness of 120 μm illustrated in FIG. 1 was obtained.

<When Biaxially Stretching Process is Performed> (Examples 10 to 18 and Comparative Examples 5 to 10)

With Examples 10 to 18 and Comparative Examples 5 to 10, the resin sheet made of the thermoplastic resin composition as the primary film layer 3 was formed of the biaxially stretched resin sheet 3 produced by adding the calcium carbonate vesicle by 50, 70, or 80 pts.wt. with respect to high-density polyethylene and performing the biaxially stretching process.

Specifically, except that the biaxially stretching process was performed, the process was performed similar to the case of the uniaxially stretching process (Examples 1 to 9 and Comparative Examples 1 to 4). In the biaxially stretching process the resin sheet obtained by the extrusion molding method was cut into 30 cm square, the resin sheet was fixed to a stretching jig in the direction parallel to the extrusion direction, the resin sheet was fixed to the stretching jig in the direction perpendicular to the extrusion direction, and the stretching was performed in the two directions orthogonal to one another. The stretching process was performed so as to be four times by area ratio, thus manufacturing the biaxially stretched resin sheet 3 with the thickness of 30 μm.

<When Stretching Process is not Performed> (Comparative Examples 11 to 13)

With Comparative Examples 11 to 13, the resin sheet made of the thermoplastic resin composition as the primary film layer 3 was formed of the resin sheet produced by adding the calcium carbonate as the inorganic pigment on which vesiculation was not performed by 70, 60, or 50 pts.wt. with respect to high-density polyethylene, and the stretching process was not performed on the resin sheet.

Specifically, as the resin sheet, to 100 pts.wt. of the high-density polyethylene (HI-ZEX 5305E, MFR=0.8 g/10 min (190° C.) manufactured by Prime Polymer Co., Ltd.), the calcium carbonate (SOFTEN 2000 manufactured by SHIRAISHI CALCIUM KAISHA, LTD.) was added by 70, 60 or 50 pts.wt. as the inorganic pigment. After melting and kneading the substance with the meshing-type twin-screw extruder, the film manufacturing by the extrusion molding method using the thermoplastic resin composition pellet obtained by pelletization by the strand cut method was used. The film manufacturing thickness was set to 30 μm.

<When Inorganic Pigment on which Vesiculation is not Performed is Added> (Comparative Examples 14 to 21)

With Comparative Examples 14 to 21, the resin sheet made of the thermoplastic resin composition as the primary film layer 3 was formed of the uniaxially stretched resin sheet 3 produced by adding the calcium carbonate as the inorganic pigment on which the vesiculation was not performed by 70, 60, or 50 pts.wt. with respect to high-density polyethylene and performing the uniaxially stretching process.

Specifically, except that the calcium carbonate as the inorganic pigment on which the vesiculation was not performed was added to the resin sheet, the decorative sheet 1 obtained with the configuration and by the manufacturing method identical to the case of performing the above-described uniaxially stretching (Examples 1 to 9 and Comparative Examples 1 to 4) was used.

The infrared absorption spectrum in the direction parallel to the extrusion direction and the infrared absorption spectrum in the direction perpendicular to the extrusion direction of the uniaxially stretched resin sheets 3, the biaxially stretched resin sheets 3 and the resin sheets on which the stretching process was not performed in the above-described Examples 1 to 18 and Comparative Examples 1 to 21 were measured by the polarized Fourier type infrared spectroscopy measurement to calculate the dichroic ratio R using the above-described Formula (1). An exothermic evaluation test and a post-processability evaluation test were conducted on the respective decorative sheets 1. The detailed evaluation methods of the respective evaluation tests were as follows.

<Exothermic Evaluation Test>

Here, under the technical criteria for flame-retardant materials regulated in Order for Enforcement of the Building Standards Act, the following requirements need to be met in the exothermic evaluation test using a cone calorimeter testing machine compliant to ISO 5660-1 (Order for Enforcement of the Building Standards Act, Article 108-2, items (i) and (ii). For approval of the decorative sheet of this example as the flame-retardant material, it is necessary to meet all of the following required items 1 to 3 in a heating period of 20 minutes by heating at a radiant heat of 50 kW/m² in a state where the decorative sheet is stuck to an incombustible substrate.

1. The total calorific value is 8 MJ/m² or less.
2. The highest heat generation rate does not exceed 200 kW/m² for successive 10 seconds or more.
3. Neither a crack nor a hole penetrating to a back surface, which is harmful in terms of fire prevention, occurs.

The incombustible substrate is selectable for use from a gypsum board, a fiber-mixed calcium silicate plate, or a galvanized steel plate.

Specifically, regarding the exothermic evaluation test with the cone calorimeter testing machine, the case where the flame-retardant material achieved meeting both of all the above-described items 1 to 3 and the requirements described in Article 108-2, items (i) and (ii) in the Order for Enforcement was evaluated as "Good", and the case where even one requirement was not met was evaluated as "Poor", thus evaluating flame retardancy. Note that, the case where this test was not able to be conducted was represented by "-".

<Post-Processability Evaluation Test>

In the post-processability evaluation test (a V-groove bending work test), the decorative sheet 1 was laminated to the substrate B with an adhesive (Rikabondo manufactured by CSC. Co., ltd.) and was sufficiently dried. After that, a V-shaped groove was created on the surface of the substrate B on the side opposite to the side on which the decorative sheet 1 was stuck so as not to damage the decorative sheet 1 and the surface of the decorative sheet 1 was folded by a mountain fold. In the decorative sheet 1 after the folding, the case where a change in the surface was not recognized was evaluated as "Good", the cases where changes in the surface such as a crack and whitening were recognized were evaluated as "crack" and "whitening", respectively, thus evaluating the post-processability. Note that, the case where this test was not able to be conducted was represented by "-".

Tables 1 to 4 describe the values of the dichroic ratio R of the uniaxially stretched resin sheets 3, the biaxially stretched resin sheets 3, and the resin sheets on which the stretching process was not performed, the results obtained from the respective evaluation tests, and the comprehensive evaluations of the decorative sheets 1. The definitions of the terms of the comprehensive evaluations are as follows.

<Comprehensive Evaluation>

Poor: Has neither the flame retardancy nor post-processability.

Good: Excellent in the flame retardancy and has the post-processability required for the decorative sheet.

Excellent: Considerably excellent in the flame retardancy and post-processability.

TABLE 1

| | Additive amount of inorganic pigment [pts. wt.] | Vesiculation | Dichroic ratio R | Stretching process | Flame retardancy | Post-processability | Evaluation |
|---|---|---|---|---|---|---|---|
| Example 1 | 50 | Performed | 0.3 | Uniaxially stretching process | Good | Excellent | Excellent |
| Example 2 | 50 | Performed | 0.5 | Uniaxially stretching process | Good | Excellent | Excellent |
| Example 3 | 50 | Performed | 0.9 | Uniaxially stretching process | Good | Good | Good |
| Example 4 | 70 | Performed | 0.3 | Uniaxially stretching process | Good | Good | Good |
| Example 5 | 70 | Performed | 0.4 | Uniaxially stretching process | Good | Good | Good |
| Example 6 | 70 | Performed | 0.5 | Uniaxially stretching process | Good | Excellent | Excellent |
| Example 7 | 70 | Performed | 0.6 | Uniaxially stretching process | Good | Excellent | Excellent |
| Example 8 | 70 | Performed | 0.8 | Uniaxially stretching process | Good | Excellent | Excellent |
| Example 9 | 70 | Performed | 0.9 | Uniaxially stretching process | Good | Excellent | Excellent |
| Comparative Example 1 | 70 | Performed | 0.25 | Uniaxially stretching process | Poor | Crack | Poor |
| Comparative Example 2 | 70 | Performed | 0.95 | Fractured | — | — | Poor |
| Comparative Example 3 | 80 | Performed | 0.25 | Fractured | — | — | Poor |
| Comparative Example 4 | 80 | Performed | 0.3 | Fractured | — | — | Poor |

TABLE 2

| | Additive amount of inorganic pigment [pts. wt.] | Vesiculation | Dichroic ratio R | Stretching process | Flame retardancy | Post-processability | Evaluation |
|---|---|---|---|---|---|---|---|
| Example 10 | 50 | Performed | 0.3 | Biaxially stretching process | Good | Excellent | Excellent |
| Example 11 | 50 | Performed | 0.5 | Biaxially stretching process | Good | Good | Good |
| Example 12 | 50 | Performed | 0.9 | Biaxially stretching process | Good | Good | Good |
| Example 13 | 70 | Performed | 0.3 | Biaxially stretching process | Good | Good | Good |
| Example 14 | 70 | Performed | 0.4 | Biaxially stretching process | Good | Good | Good |
| Example 15 | 70 | Performed | 0.5 | Biaxially stretching process | Good | Excellent | Excellent |
| Example 16 | 70 | Performed | 0.6 | Biaxially stretching process | Good | Excellent | Excellent |
| Example 17 | 70 | Performed | 0.8 | Biaxially stretching process | Good | Excellent | Excellent |
| Example 18 | 70 | Performed | 0.9 | Biaxially stretching process | Good | Excellent | Excellent |
| Comparative Example 5 | 50 | Performed | 0.95 | Biaxially stretching process | Poor | Good | Poor |
| Comparative Example 6 | 70 | Performed | 0.25 | Biaxially stretching process | Poor | Crack | Poor |
| Comparative Example 7 | 70 | Performed | 0.93 | Fractured | — | — | Poor |
| Comparative Example 8 | 70 | Performed | 0.95 | Fractured | — | — | Poor |
| Comparative Example 9 | 80 | Performed | 0.25 | Fractured | — | — | Poor |
| Comparative Example 10 | 80 | Performed | 0.3 | Fractured | — | — | Poor |

TABLE 3

| | Additive amount of inorganic pigment [pts. wt.] | Vesiculation | Dichroic ratio R | Stretching process | Flame retardancy | Post-processability | Evaluation |
|---|---|---|---|---|---|---|---|
| Comparative Example 11 | 70 | Not performed | 0.01 | Not performed | Poor | Crack | Poor |
| Comparative Example 12 | 60 | Not performed | 0.01 | Not performed | Poor | Crack | Poor |
| Comparative Example 13 | 50 | Not performed | 0.01 | Not performed | Poor | Crack | Poor |

TABLE 4

| | Additive amount of inorganic pigment [pts. wt.] | Vesiculation | Dichroic ratio R | Stretching process | Flame retardancy | Post-processability | Evaluation |
|---|---|---|---|---|---|---|---|
| Comparative Example 14 | 70 | Not performed | 0.25 | Uniaxially stretching process | Poor | Crack | Poor |
| Comparative Example 15 | 70 | Not performed | 0.3 | Uniaxially stretching process | Poor | Crack | Poor |
| Comparative Example 16 | 70 | Not performed | 0.4 | Uniaxially stretching process | Poor | Crack | Poor |
| Comparative Example 17 | 70 | Not performed | 0.5 | Uniaxially stretching process | Good | Crack | Poor |
| Comparative Example 18 | 60 | Not performed | 0.4 | Uniaxially stretching process | Poor | Crack | Poor |
| Comparative Example 19 | 60 | Not performed | 0.5 | Fractured | — | — | Poor |
| Comparative Example 20 | 50 | Not performed | 0.4 | Uniaxially stretching process | Poor | Crack | Poor |
| Comparative Example 21 | 50 | Not performed | 0.6 | Fractured | — | — | Poor |

As described in Table 1, the decorative sheets 1 of Examples 1 to 9, which used the uniaxially stretched resin sheet 3 produced by adding the calcium carbonate vesicle by 50 or 70 pts.wt., used the uniaxially stretched resin sheet 3 with the value of dichroic ratio R of R≥0.3. Accordingly, the decorative sheets 1 met the criteria for flame-retardant material and had the excellent post-processability. The decorative sheets 1 of Examples 1 and 2, which used the uniaxially stretched resin sheet 3 produced by adding the calcium carbonate vesicle by 50 pts.wt. and with the value of dichroic ratio R of 0.3≤R≤0.5, and the decorative sheets 1 of Examples 6 to 9, which used the uniaxially stretched resin sheet 3 produced by adding the calcium carbonate vesicle by 70 pts.wt. and with the value of dichroic ratio R of 0.5≤R≤0.9, especially had the excellent post-processability. Compared with this, the decorative sheet 1 of Comparative Example 1, which used the uniaxially stretched resin sheet 3 with the value of dichroic ratio R of R<0.3 did not meet the criteria for flame-retardant material and "crack" was recognized in the post-processability evaluation test. Comparative Example 2, which used the uniaxially stretched resin sheet 3 with the value of dichroic ratio R of R>0.9, caused a fracture during processing the uniaxially stretching process.

As described in Comparative Example 3 and Comparative Example 4 in Table 1, the one with the additive amount of the inorganic pigment of 80 pts.wt. caused the fracture while the uniaxially stretching process was processed. With Comparative Examples 2 to 4 generating the fracture, infrared absorption spectrum was measured using the decorative sheets 1 after causing the fracture to calculate the dichroic ratio R.

As described in Table 2, the decorative sheets 1 of Examples 10 to 18, which used the biaxially stretched resin sheet 3 produced by adding the calcium carbonate vesicle by 50 or 70 pts.wt., used the biaxially stretched resin sheet 3 with the value of dichroic ratio R of R≥0.3. Accordingly, the decorative sheets 1 met the criteria for flame-retardant material and had the excellent post-processability. The decorative sheet 1 of Example 10, which used the biaxially stretched resin sheet 3 produced by adding the calcium carbonate vesicle by 50 pts.wt. and with the value of dichroic ratio R of R=0.3, and the decorative sheets 1 of Examples 15 to 18, which used the biaxially stretched resin sheet 3 produced by adding the calcium carbonate vesicle by 70 pts.wt. and with the value of dichroic ratio R of 0.5≤R≤0.9 especially had the excellent post-processability. Compared with this, the decorative sheet 1 of Comparative Example 6, which used the biaxially stretched resin sheet 3 with the value of dichroic ratio R of R<0.3 did not meet the criteria for flame-retardant material and "crack" was recognized in the post-processability evaluation test. With Comparative Example 5 used the biaxially stretched resin sheet 3 with the value of dichroic ratio R of R>0.9, while the biaxially stretching process was able to be performed but Comparative Example 5 failed to meet the criteria for flame retardancy. It is considered that, this occurs because as apparent from the value of dichroic ratio R, too much stretch of the biaxially stretched resin sheet 3 reduced the calcium carbonate vesicle present per unit area and therefore inflammability of the resin material as the main component prevailed. Furthermore, Comparative Examples 7 and 8, which used the biaxially stretched resin sheet 3 with the value of dichroic ratio R of R>0.9 caused a fracture during processing the biaxially stretching process.

As described in Comparative Examples 9 and 10 in Table 2, the one with the additive amount of the inorganic pigment of 80 pts.wt. caused the fracture while the biaxially stretching process was processed. With Comparative Examples 7 to 10 generating the fracture, infrared absorption spectrum was measured using the decorative sheets 1 after causing the fracture to calculate the dichroic ratio R.

As described in Table 3, the decorative sheets 1 of Comparative Examples 11 to 13, which used the resin sheet produced by adding the calcium carbonate on which vesiculation was not performed and also the stretching process was not performed, did not meet the criteria for flame-retardant material and "crack" was recognized in the post-processability evaluation test. The values of dichroic ratio R of the decorative sheets 1 of Comparative Examples 11 to 13 were all 0.01 or less.

Regarding the decorative sheets 1 of Comparative Examples 14 to 16, which used the uniaxially stretched resin sheets 3 produced by adding the calcium carbonate on which the vesiculation was not performed by 70 pts.wt., as described in Table 4, even the one using the uniaxially stretched resin sheet 3 with the value of dichroic ratio R of R≥0.3 did not meet the criteria for flame-retardant material and "crack" was recognized in the post-processability evaluation test. The decorative sheet 1 of Comparative Example 17 with the value of dichroic ratio R of R=0.5 met the criteria for flame-retardant material but "crack" was recognized in the post-processability evaluation test and the decorative sheet 1 did not have mechanical strength required for the decorative sheet. While the uniaxially stretching process was able to be performed on the decorative sheets 1 of Comparative Example 18 with the additive amount of the calcium carbonate of 60 pts.wt. and Comparative Example 20 with the additive amount of the calcium carbonate of 50 pts.wt., the decorative sheets 1 did not meet the criteria for flame-retardant material and "crack" was recognized in the post-processability evaluation test. The decorative sheets 1 of Comparative Examples 19 and 21 caused a fracture during processing the uniaxially stretching process. With Comparative Examples 19 and 21 generating the fracture, infrared absorption spectrum was measured using the decorative sheets 1 after causing the fracture to calculate the dichroic ratio R.

It has been apparent from the above-described evaluation results that as described in Examples 1 to 18, by the use of the uniaxially stretched resin sheet 3 and the biaxially stretched resin sheet 3 with the value of dichroic ratio R being configured to be R≥0.3 by adding the inorganic pigment vesicle and performing the uniaxially stretching process or the biaxially stretching process, the decorative sheet 1 excellent in flame retardancy and post-processability can be obtained.

It has been apparent that the use of the uniaxially stretched resin sheet 3 with the value of dichroic ratio R of 0.3≤R≤0.5 produced by setting the additive amount of the inorganic pigment vesicle of 50 pts.wt. and performing the uniaxially stretching process; the biaxially stretched resin sheet 3 with the value of dichroic ratio R of R=0.3 produced by setting the additive amount of the inorganic pigment vesicle of 50 pts.wt. and performing the biaxially stretching process; or the uniaxially stretched resin sheet 3 or the biaxially stretched resin sheet 3 with the value of dichroic ratio R of 0.5≤R≤0.9 produced by setting the additive amount of the inorganic pigment vesicle of 70 pts.wt. and performing the uniaxially stretching process or the biaxially stretching process can obtain the decorative sheet 1 significantly excellent in post-processability.

The decorative sheet 1 of the present invention is not limited to the above-described embodiments and examples and can be variously changed within the scope of not deteriorating the features of the present invention.

Reference Example

The following briefly describes decorative sheets other than the decorative sheets described in this embodiment as reference examples of the present invention.

Conventionally, the decorative sheet made of polyvinyl chloride based resin excellent in processing suitability and flame retardancy has been used as the main material of the decorative sheet; however, toxic gas occurred during an incineration process after disposal has been regarded as a problem. In view of this, as a material substituted for the polyvinyl chloride based resin, the polyolefin-based resin is proposed.

However, while the toxic gas during incineration is reduced with the decorative sheet using the polyolefin-based resin, this resin is one of the resins of high inflammability and therefore it is difficult to apply the polyolefin-based resin to the decorative sheet to which the flame retardancy is required.

To provide the polyolefin-based resin with the flame retardancy, as described in the above-described PTL 1 to PTL 3, the addition of phyllosilicate, metallic hydroxide, a brominated flame-retardant agent, a phosphorus flame-retardant agent, a chlorinated flame-retardant agent, and a flame-retardant agent such as glass fiber or melamine derivative to the polyolefin-based resin has been attempted. However, in the first place, to provide the flame retardancy to the polyolefin-based resin with high inflammability, adding a large amount of a flame-retardant agent is necessary. Accordingly, as the flame retardancy is improved, the mechanical property becomes deteriorated. This possibly has resulted in poor post-processability such as a V-groove bending work.

REFERENCE SIGNS LIST

1 decorative sheet
2 primer layer
3 primary film layer (uniaxially stretched resin sheet, biaxially stretched resin sheet)
4 pattern printed layer
5 adhesive layer
6 transparent resin layer (transparent resin sheet)
6a emboss pattern
7 top coat layer
B substrate

The invention claimed is:

1. A decorative sheet comprising a plurality of resin layers, wherein:
at least one layer of the resin layers is formed of an uniaxially stretched resin sheet or a biaxially stretched resin sheet comprising a thermoplastic resin composition, the thermoplastic resin composition comprising a polyolefin-based resin to which an inorganic pigment vesicle is added, the inorganic pigment vesicle containing an inorganic pigment in a vesicle having a monolayer outer membrane, and
the uniaxially stretched resin sheet and the biaxially stretched resin sheet have a value of a dichroic ratio R of R≥0.3, the value being calculated from absorbance peak values at a wave number of 997(±5) $cm^{-1}$ of an infrared absorption spectrum in a direction parallel to an extrusion direction during film manufacturing and an infrared absorption spectrum in a direction perpendicular to the extrusion direction during the film manufacturing obtained by a polarized Fourier type infrared spectroscopy measurement using the following formula (1):

[Formula 1]

Dichroic ratio $R$=(Absorbance peak value in parallel direction−Absorbance peak value in perpendicular direction)/(Absorbance peak value in parallel direction+Absorbance peak value in perpendicular direction)    (1).

2. The decorative sheet according to claim 1, wherein the value of dichroic ratio R is 0.5≤R≤0.9.

\* \* \* \* \*